United States Patent [19]

Wolf

[11] Patent Number: 4,526,795

[45] Date of Patent: Jul. 2, 1985

[54] METHOD FOR PRODUCING CROISSANTS

[75] Inventor: Andrew Wolf, Deerfield, Ill.

[73] Assignee: Kitchens of Sara Lee, Inc., Deerfield, Ill.

[21] Appl. No.: 578,755

[22] Filed: Feb. 9, 1984

[51] Int. Cl.³ .................. A21D 13/00; A21D 8/02
[52] U.S. Cl. ................................ 426/297; 426/556; 426/501; 426/502; 426/503
[58] Field of Search .............. 426/94, 275, 297, 283, 426/284, 556, 496, 501, 502, 503

[56] References Cited

U.S. PATENT DOCUMENTS

| | | | |
|---|---|---|---|
| 3,225,717 | 12/1965 | Page | 426/501 |
| 3,277,845 | 10/1966 | Poppe et al. | |
| 3,494,302 | 2/1970 | Wolf et al. | |
| 3,611,950 | 10/1971 | Battaglia | |
| 3,620,172 | 11/1971 | Mueller | |
| 3,901,137 | 8/1975 | Jimenez | 99/353 |
| 4,275,647 | 6/1981 | Chambers et al. | 99/339 |

OTHER PUBLICATIONS

J. Child and S. Beck, 1974, Mastering the Art of French Cooking, A. Knopf, New York, pp. 96-103.
P. Montagne, 1961, Larousse Gastronomique, Crown Publishers Inc., N.Y., pp. 322-323.

*Primary Examiner*—Robert Yoncoskie
*Assistant Examiner*—Carolyn Paden
*Attorney, Agent, or Firm*—Charles Y. Lackey; William S. Burden

[57] ABSTRACT

A method for the production of croissants wherein a continuously advancing dough sheet is severed into sections and ribbons of a filler substance are continuously extruded thereon prior to each section being curled upon itself as it continues to advance continuously to a station where portions of the curled, filled sections are subjected to pressure and subsequently severed in areas where pressure was applied to form croissant articles.

7 Claims, 6 Drawing Figures

METHOD FOR PRODUCING CROISSANTS

BRIEF SUMMARY AND OBJECTS OF THE INVENTION

The present invention relates to a new and improved system for the production of food products, and particularly relates to the production of croissants.

Heretofore, croissants have been made by cutting a dough into individual triangular pieces. The pieces are then individually hand- or machine-curled and formed into a half-moon or crescent configuration. If it is desired to provide a filling for the croissants, a spot depositor is used to deposit the filling intermittently upon the triangular pieces prior to hand-curling. In addition to being time-consuming and expensive, when the filled croissants are formed by hand, it is difficult to position properly the filling in the center of each triangular dough piece. If the filling is off-center, it will run out of the curled dough and the product will be unacceptable. Such processing is tedious and time-consuming and necessarily makes the product more expensive and less sanitary. Another disadvantage of depositing filling in spots is that the filling is concentrated in the center of each croissant, leaving the two ends dry, without filling.

According to the present invention, a dough sheet having a desired width and thickness is continuously advanced by a conveyor assembly past a cutting mechanism where the sheet is selectively cut into a desired configuration, and past an extruder where a ribbon of filling material is continuously extruded onto the dough. Conventional curling devices curl the dough upon the filling and itself. The advancing curled dough is then sealed and subsequently severed to form discrete food articles. Each article may then be formed into a crescent-shaped configuration.

The major advantage of the present invention is that croissants can be produced efficiently at high speed. An additional advantage is that a continuous ribbon extruder can be used rather than a spot depositor, thus resulting in uniform dough/filling distribution, and greater filling weight accuracy.

It is therefore an object of the present invention to provide a new and improved system for producing dough products, particularly dough products having a filler material therein.

Another object of the invention is the provision of a system which reduces manual handling of the food materials, thereby resulting in increased and more sanitary production.

Another object of the invention is to produce a croissant that is filled end-to-end without the need of manual curling.

Another object of the invention is to produce a filled croissant automatically with greater weight accuracy.

Other objects and advantages of the invention will become apparent when considered in view of the following detailed description.

For a better understanding of the invention, reference should be had to the accompanying drawings and descriptive matter.

DETAILED DESCRIPTION OF THE INVENTION

Figure 1:
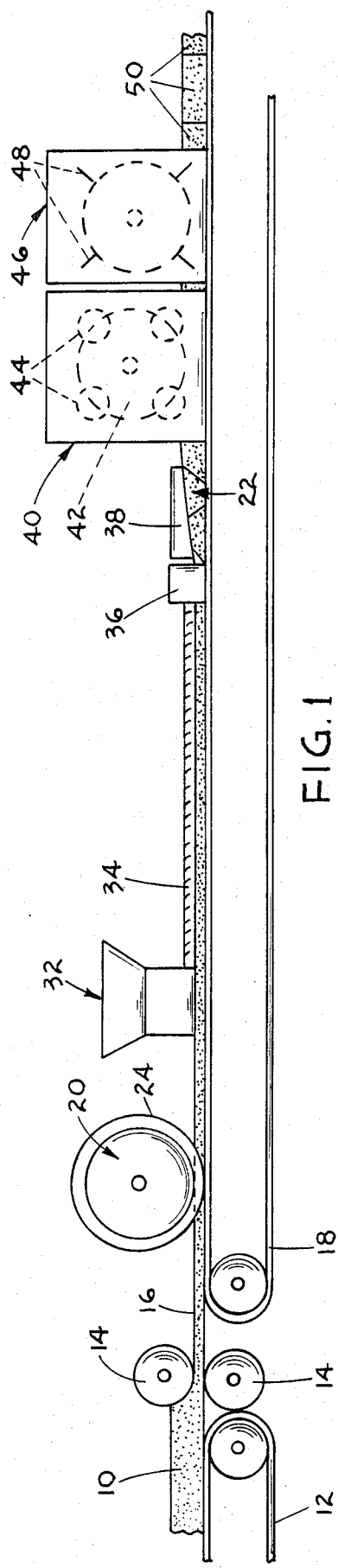
FIG. 1 is a schematic, fragmentary, side elevational view of apparatus which cooperates in accomplishing the process of the invention.

In accordance with the present invention, selected ingredients are mixed to provide dough 10 which is placed upon a belt conveyor 12. The dough 10 is advanced by the conveyor between rollers 14, 14 where the dough is formed into a relatively thin continuous layer 16 having a controlled thickness of approximately ⅛" and a uniform width. The thickness of the dough sheet 16 is controlled by advancing the dough between the outer peripheral surfaces of rollers 14, 14 which are vertically spaced apart a distance equal to the desired thickness of the dough sheet 16. As the sheet emerges from between the rollers, it is advanced by an endless belt conveyor 18. The sheet 16 is sufficiently cohesive to form a continuous sheet which is sufficiently pliable to enable subsequently severed portions to be curled or rolled into elongated tubular or generally cylindrical configurations.

Figure 2:
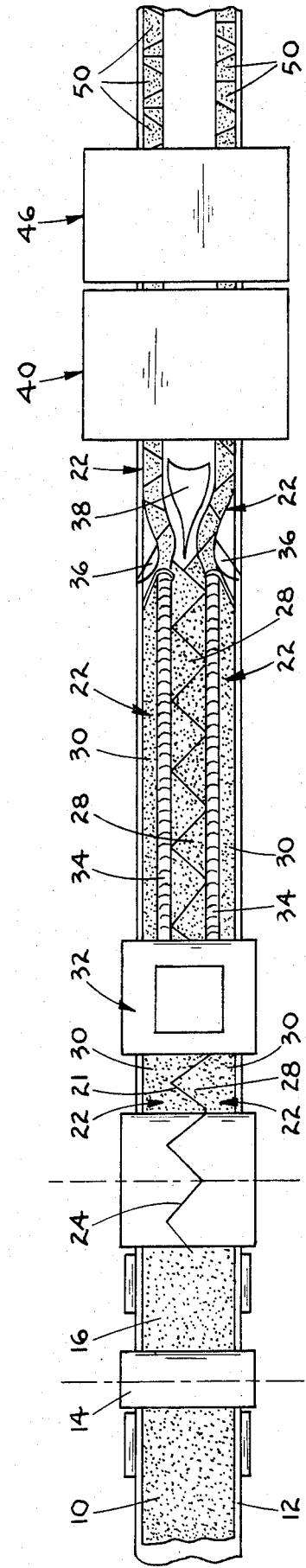
FIG. 2 is a schematic top plan view of the apparatus of FIG. 1, illustrating the process of the invention.
Figure 3:
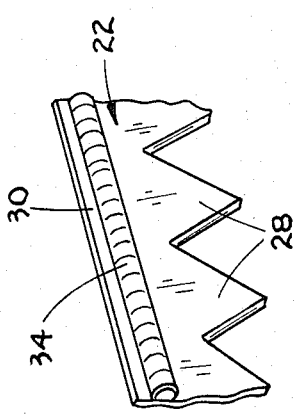
FIG. 3 is an enlarged, schematic, fragmentary view of a continuous dough sheet or ribbon cut to the desired configuration and having a ribbon of filling thereon.

The dough sheet 16 is continuously advanced through a sequence of treatment stations by the conveyor belt 18 which is driven at a constant speed by conventional means, not shown. Conventional guide means, also not shown, are provided to control the width of the sheet 16 and confine the sheet edges. Conveyor 18 moves the sheet to a rotary cutter, driven in a conventional manner, where it is cut along line 21 in a particular zigzag pattern to form two dough sections or dough ribbons 22, 22, as shown by FIGS. 2 and 3. The cutter blade 24 may comprise a series of angularly disposed blades so positioned to make alternate angled cuts in the dough. The blades are so positioned sufficiently close to the belt 18 to cooperate therewith and cut completely through the thickness of the dough sheet 16, thus dividing it into ribbons 22, 22.

Each dough ribbon 22 consists of a series of serrations comprising generally triangular shaped portions 28 integral with an elongated portion 30, resulting in each ribbon having one relatively straight edge and one edge having a generally sawtooth effect.

The two discrete dough sections or ribbons 22, 22 are continuously advanced by belt conveyor 18 past a conventional extruder 32 where, if desired, ribbons of filling 34 may be continuously deposited upon designated areas of the elongated portions 30. The amount of filling extruded may be selectively controlled, as desired.

The filling material 34, for example, may be of various types of foods and may include fruits, nuts, meats, cheeses, or combinations thereof.

A continuous ribbon filler extruder provides a greater weight accuracy of the filling than can be obtained using a spot depositor. Also, the cost of extruding continuous ribbon is less than the cost involved in applying filling using a spot depositor.

Figure 4:
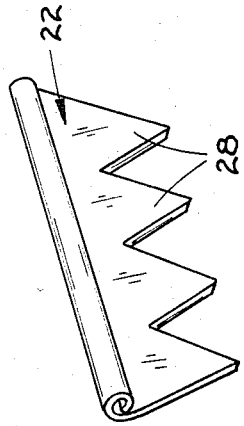
FIG. 4 illustrates a segment of the dough and filling as the dough is being curled.
Figure 5:
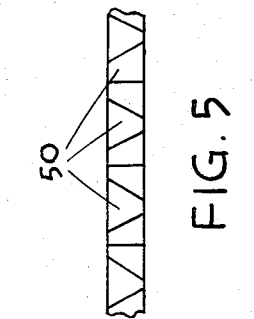
FIG. 5 is a schematic view of the curled dough, having filling therein, prior to cutting.

The dough sections or ribbons 22, 22, each having filling thereon, are continuously advanced upon belt conveyor 18 to an area where conventional curling plows 36 and 38, shown schematically in FIGS. 1 and 2, are fixedly positioned in close proximity to the upper surface of belt conveyor 18 for initially folding the straight edge portions of the dough ribbons 22, 22 over the filling 34, and which also serve to continue to curl or roll the dough sections 22, 22, as shown by FIG. 4 until the dough is completely curled about the filling and into a continuous generally cylindrical configuration, as shown by FIG. 2 intermediate the plow 38 and a sealer assembly 40.

The two generally cylindrical sections of dough and filling, positioned in spaced relation upon the belt 18, are continuously advanced to the sealer assembly 40, which may be of a conventional type, and which is schematically illustrated by FIGS. 1 and 2. The sealer 40 applies pressure to the advancing cylindrical dough and filling configurations transversely thereof at prescribed, spaced intervals to push the filling away from those areas. The elongated cylinders subsequently will be severed in the areas where pressure was applied, and since the filling has been pushed away from these areas, the filling will not tend to run out of the end portions of the individual croissants 50.

The sealer assembly 40, which may be of the rotary type, includes a series of sealing members 44 for each of the cylindrical dough and filling sections 22, 22. The sealing members 44 may be equally spaced around and extend outwardly beyond the member 42, and are adapted to move into close proximity of the belt 18 to cooperate therewith and squeeze or apply pressure to spaced areas of the cylindrical sections 22, 22.

If the croissants are produced with a filling therein, sealing of the filled dough is important to ascertain that the filling does not leak from the product after cutting.

Figure 6:
FIG. 6 is a top plan view of the croissant articles after being formed into a crescent shape.

A rotary cutter assembly 46, schematically illustrated by FIGS. 1 and 2, has series of blades 48 spaced to correspond to the spacing between the sealing members 44. The sealer assembly 40 and cutter assembly 46 are driven in synchronism in a conventional manner such that the curled sections 22, 22 are severed at selected intervals corresponding to the areas where pressure was applied. The blades 48 cooperate with the belt 18 to transversely sever the cylindrical dough and filling sections into a plurality of discrete croissant articles 50. The croissant articles 50 are discharged from the conveyor 18, formed by hand into a generally crescent-shaped configuration, and placed into molds for baking. The final product is illustrated by FIG. 6.

The final cutting could be accomplished by a guillotine-type apparatus if so desired. Also, the extruding and sealing steps could be eliminated if the croissants are not produced with a filling.

From the foregoing, it will be observed that the invention provides a new processing system which results in desired products being produced more rapidly and efficiently, and more sanitarily.

What is claimed is:

1. A method for the continuous production of croissants from an advancing sheet of croissant dough having generally parallel side edges and a predetermined thickness comprising the steps of advancing continuously said dough sheet in a first direction, selectively forming the continuously advancing dough sheet to define an elongated continuous ribbon of dough having one relatively straight, elongated edge portion and an opposite, elongated continuous edge portion having a sawtooth configuration, continuously advancing the ribbon in said first direction while curling the dough ribbon upon itself to form an elongated cylindrical configuration with the ribbon sawtooth edge portion defining the outermost portion of the cylindrical configuration, continuously advancing the elongated cylindrical configuration in generally said first direction, selectively severing the cylindrical configuration at predetermined, spaced intervals to define discrete croissant articles, and forming each article into a crescent configuration.

2. The method as recited in claim 1, wherein a plurality of dough ribbons are formed by cutting the advancing dough sheet longitudinally to divide the dough sheet into at least two dough ribbons.

3. The method as recited in claim 1, wherein the continuously advancing dough sheet is formed into a plurality of dough ribbons by slitting longitudinally the central portion of the dough sheet in a zigzag pattern.

4. The method as recited in claim 1, and further including the step of extruding continuously a ribbon of edible filling material upon the continuously advancing dough ribbon prior to curling of the dough ribbon upon itself.

5. The method as recited in claim 4, and further including the step of applying pressure to the continuously advancing cylindrical configuration at prescribed, spaced intervals to push the filling away from the areas having pressure applied, and wherein the cylindrical configuration is severed transversly at the areas where pressure was applied.

6. The method of producing a filled food product comprising the steps of advancing a dough sheet along a predetermined path, longitudinally severing the continuously advancing dough sheet to define two dough ribbons, each ribbon having an elongated relatively straight edge and an elongated generally serrated edge continuously extruding a ribbon of filler material upon selected areas of each continuously advancing dough ribbon, individually curling the advancing dough ribbons upon themselves to define elongated, spaced, generally parallel, longitudinally extending generally cylindrical dough configurations having filler material therein, applying pressure to selected, spaced areas of the continuously advancing cylindrical dough configurations to push the filling material away from the selected, spaced areas, severing transversly the continuously advancing cylindrical dough configurations at selected spaced areas corresponding to the areas where pressure was applied to form discrete articles.

7. The method of producing filled croissants comprising the steps of continuously feeding an elongated croissant dough sheet having a predetermined width and thickness along a predetermined path, separating the dough sheet into at least two dough ribbons, each ribbon having an elongated, relatively straight edge and an elongated edge having alternately angled portions defining a sawtooth effect, continuously depositing a ribbon of filling on each dough ribbon adjacent to and parallel with the ribbon straight edge portion, initially folding the straight edge portion of the dough ribbon over the filling ribbon and continuing to curl the dough ribbon and filling into a cylindrical configuration with the alternately angled edge portions being on the outer periphery thereof, continuously advancing and sequentially subjecting the cylindrical dough and filling configuration to pressure at equally spaced intervals to substantially remove filling from selected areas where pressure is applied, and in immediate following relation to transversely cut the advancing cylindrical dough and filling configuration at intervals where pressure was applied to result in a series of discrete filled croissant articles, and forming each discrete article into a crescent-shaped configuration.

* * * * *